United States Patent
Mastie et al.

(10) Patent No.: US 6,373,585 B1
(45) Date of Patent: Apr. 16, 2002

(54) LOAD BALANCING FOR PROCESSING A QUEUE OF PRINT JOBS

(75) Inventors: Scott David Mastie, Longmont; Hongliang Tong, Boulder; Ming Xie, Superior; Christopher Brian Hirsch, Arvada, all of CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/140,480

(22) Filed: Aug. 26, 1998

(51) Int. Cl.[7] ............................................. G06F 15/00
(52) U.S. Cl. .................... 358/1.15; 358/1.13; 358/1.16; 710/105
(58) Field of Search ................................ 358/1.1, 1.13, 358/1.14, 1.15, 1.16, 1.17, 1.18, 1.19, 448, 452; 399/80, 82; 710/100, 101, 102, 105

(56) References Cited

U.S. PATENT DOCUMENTS

| | | | | |
|---|---|---|---|---|
| 5,226,112 A | * | 7/1993 | Mensing et al. ............ | 358/1.15 |
| 5,228,118 A | * | 7/1993 | Sasaki ........................ | 358/1.13 |
| 5,619,624 A | * | 4/1997 | Schoenzeit et al. ......... | 358/1.19 |
| 5,768,483 A | * | 6/1998 | Maniwa et al. ............. | 358/1.15 |
| 6,043,898 A | * | 3/2000 | Jacobs ........................ | 358/1.15 |
| 6,215,559 B1 | * | 4/2001 | Bryniarski et al. ......... | 358/1.15 |

* cited by examiner

Primary Examiner—Mark Wallerson
(74) Attorney, Agent, or Firm—David W Victor; Konrad Raynes Victor&Mann LLP

(57) ABSTRACT

A system is provided for processing a print job. A processing unit, such as a server, receives a plurality of print job files. Each print job file is associated with a data file. The print job files are maintained in a queue of print job files. The processing unit selects a print job file in the queue and processes a data structure indicating a plurality of transform processes and the availability of each indicated transform process to process a data file. The processing unit selects an available transform process, such as a RIP process, in response to processing the data structure and indicates in the data structure that the selected transform process is unavailable. The transform process processes the data file associated with the selected print job to generate a printer supported output data stream.

28 Claims, 4 Drawing Sheets

LOAD BALANCING FOR PROCESSING A QUEUE OF PRINT JOBS

CROSS-REFERENCE TO RELATED APPLICATIONS

This application is related to the following co-pending and commonly-assigned patent applications, all of which are filed on the same date herewith, and all of which are incorporated herein by reference in their entirety:

"Selecting Printing Attribute Values in a Network Printing System," by Scott D. Mastie and Arthur R. Roberts, application Ser. No. 09/143,281;

"Multiple Insertion Point Queue to Order and Select Elements to be Processed," by Scott D. Mastie and Ming Xie, application Ser. No. 09/140,482; and "Rule Based Selection Criteria For Controlling Print Job Distribution," by Scott D. Mastie and Ming Xie, application Ser. No. 09/140,613.

BACKGROUND OF THE INVENTION

1. Field of the Invention

The present invention relates to a method and system for processing data files into print files ready to be printed and, specifically, to load balancing of processing tasks across processing operations.

2. Description of the Related Art

Network printing systems generally comprise an assemblage of different printers, client computers, servers, and other components connected over a network. A print job is assembled at a client computer and transmitted over the network to a server linked to a variety of printers. The printers may have different printing capabilities. Thus, for a given submitted print job, some printers in the network may not be able to process the print job. To route print jobs through a network printing system, International Business Machines Corporation (IBM) provides Printing Systems Manager (PSM) products that provide centralized and distributed management of a network printing system. The IBM PSM systems manage the flow of print jobs and insure that a print job is routed to a printer that can handle the job.

A print job is comprised of one or more electronically-stored files and the print attributes therefor. The print attributes inform the printer how to process the files. To assemble print jobs, prior art systems include software installed on the client computer that displays a graphical user interface (GUI). Using a mouse, keyboard, etc., the user selects from a menu of options displayed in the GUI the components and print attributes for a print job. The client computer, under control of the installed software, would then create an electronically-stored job ticket based on the information entered by the user.

Job tickets typically only define the print attributes for a single file. However, a document may be comprised of multiple files, each having one or more print attributes. A file submitted to the printer often includes printer instructions in a page description language (PDL) such as POST SCRIPT™. POST SCRIPT is a trademark of Adobe Systems, Incorporated. The Post Script language is used by many printers and applications to provide the complex fonts, graphics, and image handling capabilities required by today's applications. The Post Script language must be interpreted by a transform process in the printer or elsewhere in the network to produce a printed image file that is ready to be printed. Print image files are in a bit-mapped image format, also known as a raster image. A raster image processor (RIP) translates PDL files to a raster image or RIP version of the file. In the desktop publishing environment, it can take several hours to transform a large PDL print file to its RIP version.

The IBM AIX☐ PRINT SERVICES FACILITY☐/6000 (PSF/6000) software system transforms Post Script files into an Advanced Function Presentation data stream (AFP data stream) for printing on printers attached to a machine implementing the PSF/6000 software. AIX is a registered trademark of IBM and PRINT SERVICES FACILITY is a trademark of IBM. The PSF/6000 software uses the PS2AFP transform command to transform Post Script and other file formats into an AFP data stream file without submitting it immediately to the printer. The PS2AFP command runs as a daemon, which is a program that runs unattended in the background of the operating system. Daemon processes generally provide services that must be available at all times. A daemon runs continuously, looking for work to do, performing that work, and waiting for more work.

Prior art systems permit multiple instances of transform processes, such as a RIP process, to run simultaneously on a controller to concurrently transform multiple files to printer ready files, such as RIP files. The IBM AIX software includes scheduling software, referred to as the Multiple Printer Controller (MPC), which interfaces one or more clients to one or more printers. The MPC system is capable of executing multiple daemons, such as instances of PS2AFP, to simultaneously transform, i.e., RIP, multiple print jobs. The user may define multiple print queues in the MPC system memory to handle different types of files, such as Post Script files. A print queue may be added for each printer in the network printing system. Once in the print queue a daemon is responsible for managing the job and passing the print job to the appropriate printer. The daemon determines the type of print job, e.g., Post Script, to determine the appropriate filter or transform process to apply.

In the above prior art systems, including those that implement the ISO DPA 10175, POSIX 1387.4 and PSIS printing standards, such as the IBM Printer Resource Manager products, a print job is routed to a controller or logical printer depending on the attributes of the print job, i.e., print media, fonts, page size, orientation, page order, etc. In such systems, controllers may be dedicated to handling print queues for a set of printers. Thus, the nature of the print job determines which controller receives the print job. Notwithstanding, further improvement in the throughput of print jobs is desired over the throughput resulting from current selection criteria.

SUMMARY OF THE PREFERRED EMBODIMENTS

To overcome the limitations in the prior art described above, the preferred embodiments disclose a system for processing a print job. A processing unit receives a plurality of print job files, wherein each print job file is associated with a data file. The print job files are associated with a queue of print job files. The processing unit selects a print job file in the queue and processes a data structure indicating a plurality of transform processes and the availability of each indicated transform process to process a data file. The processing unit selects an available transform process in response to processing the data structure and indicates in the data structure that the selected transform process is now unavailable. The transform process processes the data file associated with the selected print job to generate a printer supported output data stream.

In further embodiments, a plurality of transform processes are implemented in a plurality of processing units. In such case, the data structure indicates a processing unit address and an address of the transform process executing within the processing unit. The selection of an available transform process comprises determining the address of the processing unit executing the selected transform process and the address of the selected transform process within the processing unit.

In current systems where the nature of the print job attributes determines the selection of a logical printer, certain controllers may be underutilized if the printer they are associated with is underutilized and other controllers associated with highly utilized printers may develop a backlog of print jobs waiting to be RIP processed. Such current systems do not optimally distribute print jobs across the RIP processes to minimize the wait before a queued print job is transformed, i.e., RIP processed.

Preferred embodiments provide a method and system for queuing print jobs and distributing print jobs across multiple transform processes, such as RIP processes. The transform processes may be executed in multiple controller units. The preferred embodiments load balance the queue of print jobs across the multiple controller units and transform processes executed therein to prevent both under utilization of available transform (RIP) processes and the situation where numerous print jobs are queued and backlogged at a single controller unit while other controller units have available transform processes.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural and operational changes may be made without departing from the scope of the present invention.

HARDWARE AND SOFTWARE ENVIRONMENT

Figure 1:
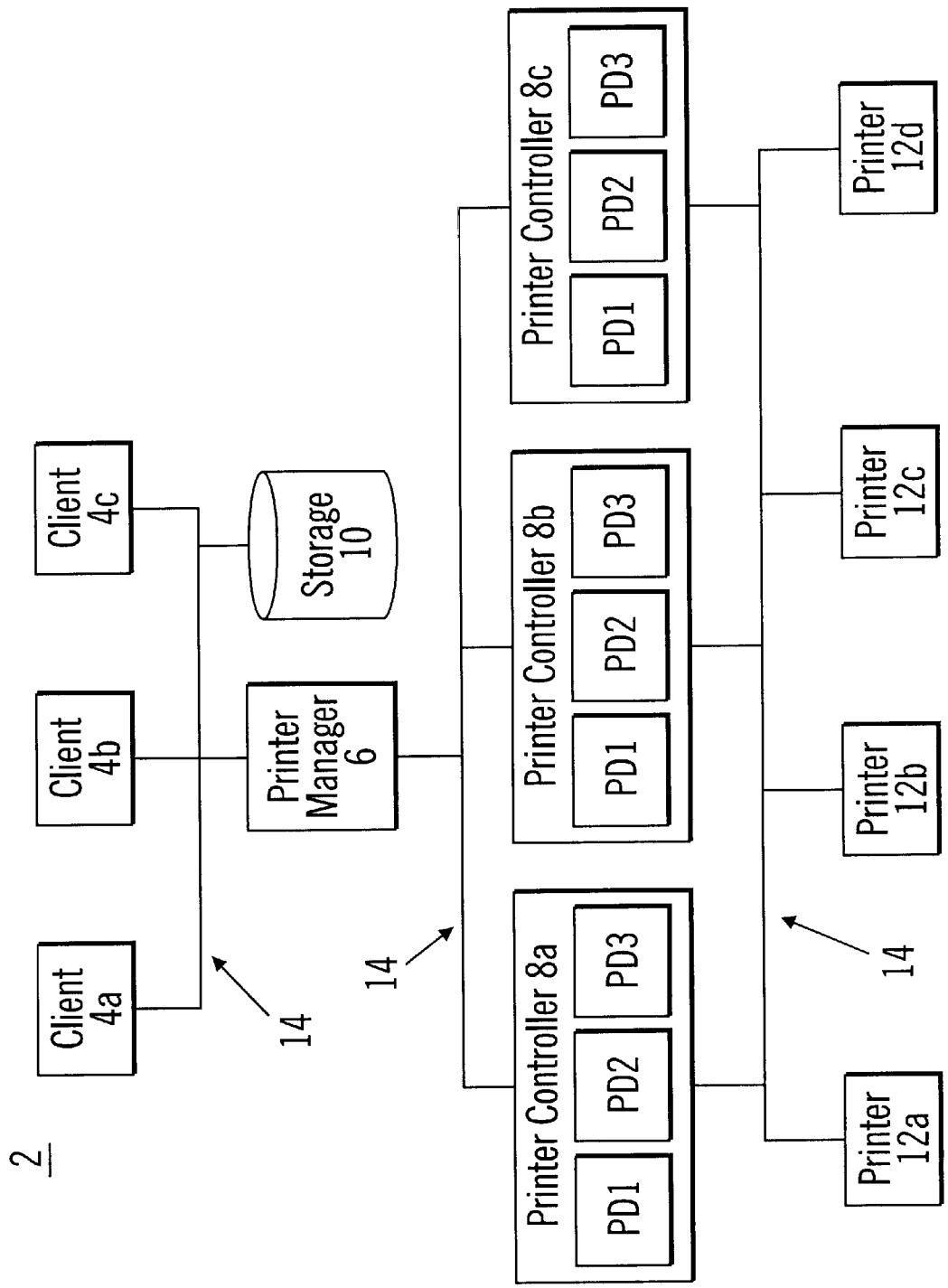
FIG. 1 is a block diagram illustrating a software and hardware environment in which preferred embodiments of the present invention are implemented.

FIG. 1 illustrates a preferred hardware and software environment in which preferred embodiments of the present invention are implemented. A network printing system 2 is comprised of a plurality of client computers 4a, b, c connected to a printer manager 6, which routes print jobs received from the clients 4a, b, c to one of a plurality of printer controllers 8a, b, c. The clients 4a, b, c and the printer manager 6 may access a storage device 10 which may store various printer related files. The printer controllers 8a, b, c are each capable of executing multiple instances of printer daemons PD1, PD2, PD3. Each printer daemon (PD) can transform an input data file to a format that may be processed by the printer. For instance, if the print job was a Post Script file, then the printer daemon (PD) would transform the Post Script file to a RIP image file. The IBM PS2AFP daemon program performs such a transformation. The printer daemons (PD) executing in multiple printer controllers 8a, b, c may be capable of simultaneously transforming different types of input data streams, e.g., Post Script, ditroff, PCL□, TeX, etc. PCL is a trademark of the Hewlitt-Packard Company. The printer daemons in the controllers 8a, b, c then transfer the processed data file to one of several printers 12a, b, c, d through a backend program that selects the printer. The printers 12a, b, c, d may be any suitable printer machine known in the art, such as the IBM INFOPRINT series of printers. INFOPRINT is a trademark of IBM.

A network system 14 links the clients 4a, b, c to the printer manager 6 and storage device 10, the printer manager 6 to the printer controllers 8a, b, c, and the printer controllers 8a, b, c, to the printers 12a, b, c, d. The network 14 may be comprised of any suitable network architecture known in the art, such as LAN, Ethernet, WAN, System Area Network (SAN), Token Ring, LocalTalk, TCP/IP, the Internet, etc. Alternatively, there may be separate and different networks between the clients 4a, b, c, and the printer manager 6, and the printer controllers 8a, b, c and the printers 12a, b, c, d. In preferred embodiments, the network printing system 2 employs a distributed file system (DFS), which allows storage and retrieval of data throughout the network printing system 2.

The printer manager 6 may be a separate stand alone server including an operating system such as AIX□, OS/390 □, UNIX□, OS/2□, MVS□, WINDOWS□, etc. AIX and OS/2 are registered trademarks of IBM and OS/390 and MVS are trademarks of IBM; WINDOWS is a registered trademark of Microsoft Corporation; UNIX is a registered trademark licensed by the X/Open Company LTD. The clients 4a, b, c may be any computer system known in the art including software to submit print jobs to the printer manager 6. The storage device 10 may be any suitable non-volatile storage device, such as a direct access storage device (DASD), automated tape library (ATL), holographic units, etc., capable of storing print files. The clients 4a, b, c may build print jobs that include print files, such as Post Script files, maintained in the storage device 10. The printer controllers 8a, b, c may be printer controllers capable of executing multiple instances of printer daemons, such as the IBM Multiple Printer Controllers (MPC) software that runs on the IBM RS/6000□ server under the AIX operating system. RS/6000 is a registered trademark of IBM. The MPC software dedicates a portion of the server processor cycles to each instance of a printer daemon that transforms data to a print image. A RIP is often considered as the transform process of a Post Script file to a bit map file. The term RIP is used herein interchangeably with transform process and printer daemon (PD) to refer to any type of transform process regardless of the format of the file being transformed to a printer readable format, i.e., bitmap file. The terms RIP, RIPper, RIPped, and RIPping all refer to a particular stage or instance of a RIP transform process. As used herein the term "print job" refers to a print job that needs to be RIPped or otherwise transformed. The concurrent execution of multiple print daemons is embodied in current IBM MPC and IBM PSF/6000 software products, described in IBM publications "PSF/6000: Print Submission," document no. S544-3878-01 (Copyright IBM Corp. 1993, 1994); "PSF/6000: Print Administration," document no. S544-3817-01 (Copyright IBM Corp. 1993, 1994); "IBM Print OnDemand User Guide," document no. G544-5325-00, (Copyright IBM Corp. 1996), all of which IBM publications are incorporated herein by reference in their entirety. The printer manager 6 and printer controllers 8a, b, c would include further logic to implement the preferred embodiments of the present invention.

Each of the devices in the network 2 has a unique IP address. Moreover, each printer daemon (PD) in the printer controllers 8a, b, c may be associated with a port address. The combination of the IP address of the printer controller 8a, b, c and the port address therein provides a unique address for the printer daemon (PD). The printer manager 6 may use this unique printer daemon (PD) address to route a print job to a specific instance of one of many printer daemons executing in the printer controllers 8a, b, c.

Thus, the preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

Data Structures

Figures 2, 3:
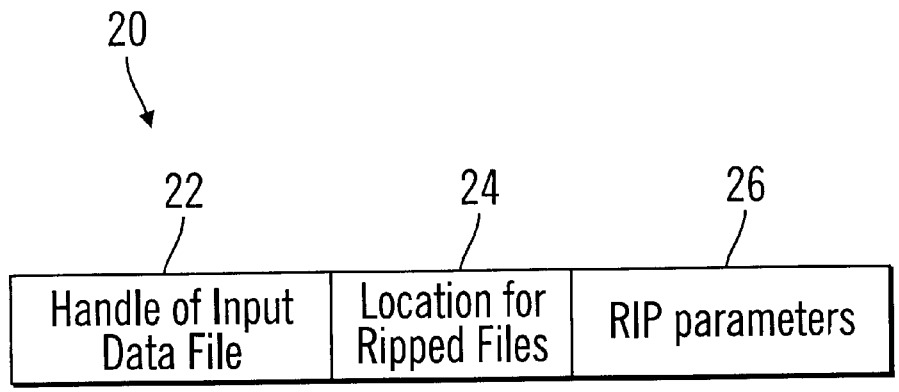
FIG. 2 illustrates a data structure for a print job in accordance with preferred embodiments of the present invention.
FIG. 3 illustrates a data structure of a table of RIP processes in accordance with preferred embodiments of the present invention.

FIG. 2 illustrates a preferred print job data structure 20 submitted to the printer manager 6 from the clients 4a, b, c that is RIPped or otherwise transformed before being submitted to the printer 12a, b, c, d. This data structure 20 or file includes an input data file handle field 22 indicating the name and location, i.e., handle, in the network 2 of the input data file(s) which the RIPper transforms. In preferred embodiments, the input data file handle field 22 only includes a pointer(s) to the input data file(s) in the network 2. However, in alternative embodiments, the print file may be transmitted with the print job to the printer manager 6 for RIPping. A location for RIPped file field 24 is an optional field indicating a location in the network printing system 2 of where to store the output of the RIPped data file(s) for the print job.

A RIP parameter field 26 indicates various RIP parameters for generating the RIPped file, including fonts (the typography used to print the text in a file); resolution; image compression type; page segments (graphics, text, and images); overlays (electronic forms); form definitions (descriptions about how the data is positioned on the physical page); page definitions (descriptions about how line data is to be formatted). These RIP parameters are sent inline with the data file to the RIP process or daemon to process the data file in accordance with the provided RIP parameters 26. In preferred embodiments, the location for the RIPped file field 24 and the RIP parameter 26 data is optional. A batch processing operation or the client 4a, b, c makes a call to an Application Program Interface (API) that creates the print job data structure 20 which is submitted to the printer manager 6.

FIG. 3 illustrates a preferred embodiment of a RIPper table data structure 30 maintained in the printer manager 6 including information on all the print daemons (PD), e.g., RIPpers, in the network printing system 2. Thus, the print daemons (PDs) of separate controllers 8a, b, c may be identified in a single table data structure 30. An enabled field 32 indicates whether the print daemon (e.g., a RIPper) is indicated as being disabled or enabled and designated to RIP the input data file(s) of print jobs. An IP address field 34 indicates the IP address of the controller 8a, b, c in the network printing system 2. A port address field 36 indicates the port on which the particular print daemon (PD), e.g., PS2AFP process, is listening, i.e., executing. The port field 36 is used to distinguish print daemon processes within a controller 8a, b, c. A state field 38 indicates the current state of the RIPper if the RIPper is enabled as indicated in the enabled field 32. The states for an enabled RIPper, i.e., print daemon, include BUSY, which indicates that the RIPper is processing a data file or READY, which indicates that the RIPper is available for a RIP operation. The RIPper table 30 includes all the available RIP engines in the network printing system 2 to process print files.

With the enabled field 32 the user may specify how much of the printer controller 8a, b, c processor cycles are dedicated to RIPping operations. If the user wants to use processor cycles for other operations, then the user may disable certain RIPpers to conserve processor cycle consumption for operations such as background printing. Alternatively, to maximize RIP processing, the user would enable all available RIPpers, i.e., print daemons, to maximize the use of processor cycles for RIPping operations. This allows the user to balance the use of processor cycles within the printer controllers 8a, b, c between RIPping operations, background printing operations, and other non-printing operations.

Figure 4:
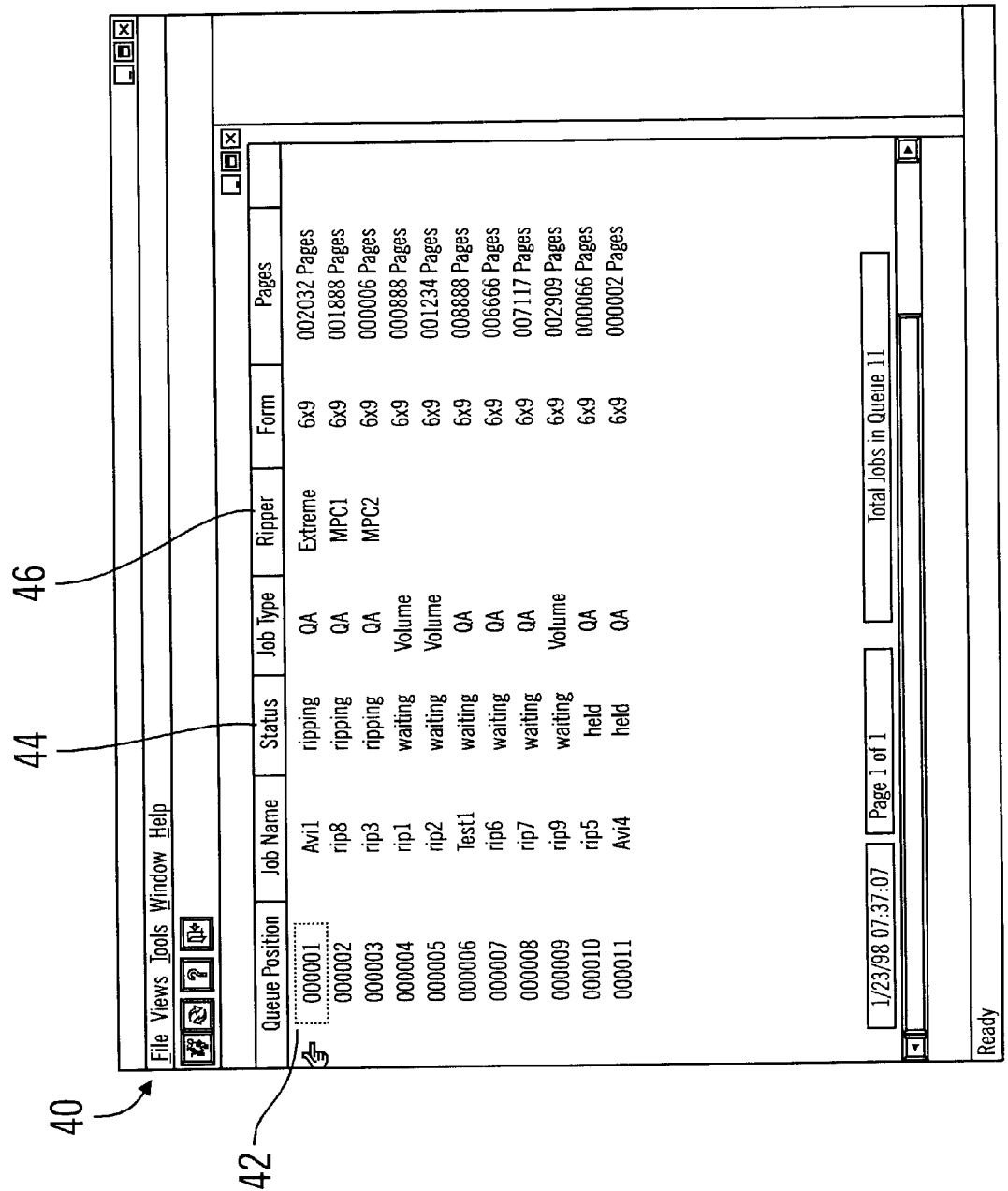
FIG. 4 illustrates a graphical user interface (GUI) displaying information on the status of queued print jobs in accordance with preferred embodiments of the present invention.

As print job data structures 20 are generated for each submitted print job, the print job data structures 20 accumulate in a single print queue data structure managed by the printer manager 6. FIG. 4 illustrates a graphical user interface (GUI) 40 of print jobs in the print queue displayed on a monitor at the printer manager 6 or elsewhere in the system 2 in accordance with preferred embodiments. A queue position field 42 indicates the position of the print job in the queue, i.e., when the printer manager 6 received and queued the print job. A status field 44 indicates the status of the print job in the queue, i.e., whether it is waiting to be RIPped, whether it is RIPping or whether an operator has indicated to hold the print job. A RIP engine field 46 indicates the name of the RIPper, i.e., print daemon, RIPping the print job.

File Status Tracking

In certain embodiments, a print job data structure 20 is presented to the printer manager 6 as a single file including the fields 22, 24, 26. As the print job 20 is processed, the file extension of the print job name changes indicating the status of the processing of the print job. The list of possible extensions for a print job file which indicates a state of the print job file include:

*.NEW—created print job file 20 presented to the printer manager 6;

*.QUE—print job file that is in the print queue;

*.RIP—print job file when a RIPper is assigned to input file;

*.OK—print job file after RIP completed successfully;

*.ERR—RIP of print job file failed;

*.HLD—print job is held by operator action;

*.CBK—ready to callback status.

As discussed, in preferred embodiments, the input print job data structure 20 received by the printer manager 6 may not include the actual print file to be RIPped. The printer manager would alter the file extension for the print job as it proceeds through various stages of the RIPper process. The callback status indicates a call back to the client 4a, b, c originating the print job providing information on the result of the submitted print job, i.e., successfully completed, failed, held by operator. The print job is removed after processing and the callback is completed.

However, those skilled in the art will appreciate that there are alternative ways to monitor and control the status of a print job during the RIPping process than the file extension system discussed above. For instance, status could be tracked without a file, such as by monitoring states in a data base record maintaining print job information. In such case, the printer manager 6 would query the data base record for the print job to RIP the print job and determine status information on the RiPping of the print job. If print jobs are maintained as database records, then the queue or ordering of the database records in the print queue could be indicated in fields or keys associated with the print job database records.

Load Balancing Print Jobs

Figure 5:
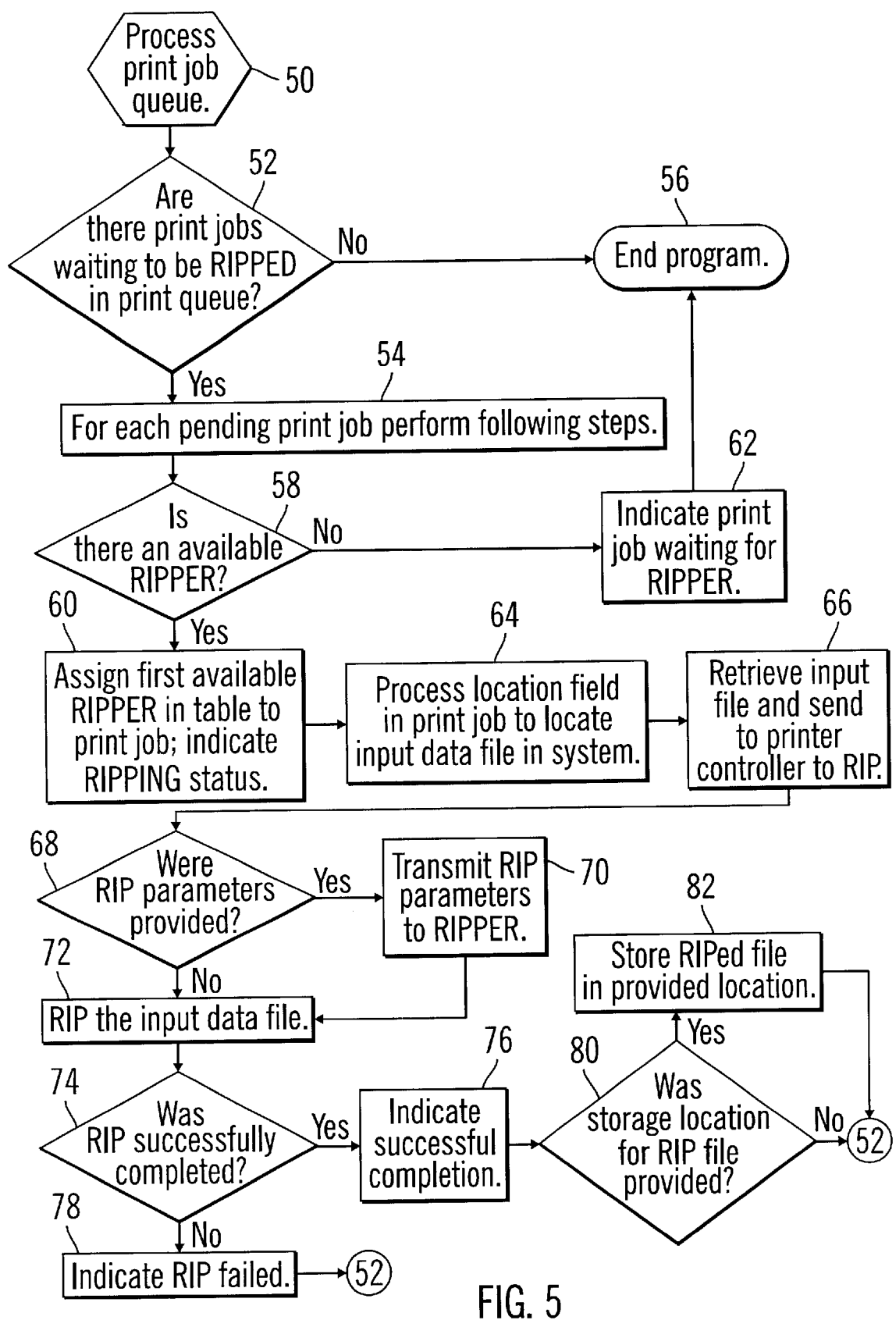
FIG. 5 is a flowchart showing logic for processing a print job in accordance with preferred embodiments of the present invention.

FIG. 5 illustrates logic implemented in the printer manager 6 to process print jobs received from clients 4a, b, c and other machines within the network printing system 2. As discussed, the printer manager 6 receives a print job file 20 having the file extension *.NEW, and changes the file extension to *.QUE when placing the print job 20 in the print queue. In preferred embodiment, the print queue reflects the priority, type, and the order in which the print job was received. The print queue may be any queuing method known in the art or the queue described in related patent application "Multiple Insertion Point Queue to Order and Select Tasks to be Processed," which application was incorporated herein by reference above.

Control begins at block 50 which represents the printer manager 6 processing the print job queue. The printer manager 6 may initiate this logic at predetermined intervals or continuously, to monitor the print queue. Control transfers to block 52 which represents the printer manager 6 determining whether the print queue includes any print jobs waiting to be RIPped, i.e., a print job file having the extension *.QUE. If so, control transfers to block 54; otherwise, control transfers to block 56 to terminate the program. After the program terminates, the printer manager 6 may immediately proceed to block 50 to continually monitor the print queue. Alternatively, the printer manager 6 may initiate an instance of the logic beginning at block 50 at predetermined intervals. If there are pending print jobs, i.e., having the file extension *.QUE, then control transfers to block 54 which represents the printer manager processing the print job at the top of the queue. In certain embodiments, the printer manager 6 may process jobs in the print queue on a first-in-first-out (FIFO) basis. In further embodiments, the print job data structure 20 may include a field indicating the priority of the print job, such as the case with the queue described in the related patent application "Multiple Insertion Point Queue to Order and Select Tasks to be Processed," which application was incorporated herein by reference above. In such case, the printer manager 6 will process pending print jobs first according to priority, and process pending jobs having the same priority on a FIFO basis.

Control then transfers to block 58 which represents the printer manager 6 processing the RIPper table 30 to determine if any enabled RIPpers are in a READY state. If so, control transfers to block 60; otherwise, control transfers to block 62.

If no RIPper is available, then at block 60 the printer manager 6 indicates that the print job is "waiting" for a RIPper. From block 60 control transfers to block 64 which represents the logic proceeding to block 56 to end the program. The printer manager 6 would continue executing the logic of FIG. 5 until it determined at block 58 that a RIPper was available. When a RIPper is available, control transfers to block 62 which represents the printer manager 6 assigning the first available (READY) RIPper indicated in the RIPper table 30 to the print job. Thus, an available (READY) RIPper may be assigned to a print job without regard to the controller 8a, b, c or printer 12a, b, c, d associated with the assigned RIPper. This selection based on RIPper availability helps optimize RIPper utilization. Control transfers to block 64 which represents the printer manager 6 processing the input data file handle field 22 for the print job to locate where the input data file is stored in the network printing system 2. For instance, the data file may be stored in storage 10. Control transfers to block 66 which represents the printer manager 6 retrieving the input data file and transferring the data file to the printer controller 8a, b, c including the RIPper, i.e., printer daemon, assigned to the print job. In alternative embodiments, any available RIPper may be selected.

Control then transfers to block 68 which represents the printer manager 6 determining whether RIP parameters were provided. If so, control transfers to block 70 to transmit the RIP parameters to the assigned RIPper. If there were no RIP parameters provided or after the RIP parameters were transmitted to the RIPper, control transfers to block 72 which represents the assigned RIPper, i.e., print daemon (PD), processing (RiPping) the input data file. At this point, the printer manager 6 may change the file extension to *.RIP. Control transfers to block 74 which represents the printer manager 6 determining whether the RIP was successfully completed.

The printer controller 8a, b, c including the RIPper may return a message to the printer manager 6 indicating the result of the RIP operation. If the RIP was successful, then at block 76 the printer manager 6 indicates that the RIP was successful, i.e., changing the file extension to *.OK. Otherwise, if the RIP failed, at block 78, the printer manager 6 would indicate the failure of the RIP, e.g., by changing the file extension to *.ERR. From block 78, control transfers back to block 52 to process any further pending print jobs in the queue. As discussed, in certain embodiments, the printer manager 6 may return a callback to the client 4a, b, c or other machine generating the print job indicating the result of the RIP operation. After indicating that the RIP was successful at block 76, control transfers to block 80 which represents the printer manager 6 determining whether the print job data structure 20, i.e., file, includes location info for RiPped files in the field 24. If so, control transfers to block 82 to store the RIPped file in the indicated location, e.g., storage 10.

Control then transfers back to block 52 to process any further pending print jobs. By saving the RIPped file, the printer manager 6 may reuse the RIPped file in subsequent printing operations without having to re-RIP the file. After a file is RIPped, the printer manager 6 maintains the RIPped file in memory for transmittal to the printer 12a, b, c, d for printing. If location information is not provided in the field 24, then the RIPped file is only available for the current operation and will not be saved for later reuse after printing. If there was no RIP file storage info 24 provided, control transfers back to block 52.

After RIPping the print file, the printer manager 6 would then execute another program to allocate the RiPped file to one of the printer controllers 8a, b, c in the system 2.

With the load balancing logic of FIG. 5, print jobs are assigned to the first available of multiple RIPpers (print daemons) from a single queue of print jobs. This insures that each pending print job is assigned to the first available RIPper. This logic minimizes the average wait time each print job must wait for an available RIPper and, hence, minimizes RIPping times regardless of the number of enabled RIPpers and queued print jobs.

Preferred embodiments can further incorporate Adobe Post Script Extreme transform processes to RIP print files. The Adobe Extreme transform process could be utilized in FIG. 5 as follows. At block 72, the Adobe Extreme transform process would RIP the input data file according to the Extreme RIP method which breaks a print job into component parts and separately RIPs each component part. The RIPped component parts are then reassembled. For instance, Adobe Extreme would break a document into component RIPs and RIP each component part, e.g., each page, separately. All the components of an Extreme document can be submitted to a single RIPper or, in alternative embodiments, the components may be distributed to separate available RIPpers, i.e., print daemons, using the preferred table data structure 30. Based on the component RIPs a comprehensive status is generated for the Adobe Extreme RIP. If the RIPping of one component fails, then the status would indicate failure for the entire RIP across all components. At block 74, the status from Extreme is considered to determine if the Extreme RIP was successful.

CONCLUSION

This concludes the description of the preferred embodiments of the invention. The following describes some alternative embodiments for accomplishing the present invention.

In many instances, the RIP process or print daemon was described as the PS2AFP daemon that transforms a Post Script file to a RIPped file. However, the above embodiments can apply to any type of transform process that receives an input data file and converts the data to an output print file that is printer ready, e.g., a RIP file. The print daemons may be any type of process to transform data files to print files, regardless of the underlying operating systems, and can cover any type of process including transform processes that handle RIP, ASCII data, ditroff data, PCL, IPDS data, line data, MO:DCA-P data, OS/2 metafile format data, SCS data, etc.

The fields in the print job data structure, print queue of print jobs, and RIPper table may differ than the arrangement of fields discussed with respect to the preferred embodiments. Moreover, the print job data structure and RIPper table data structure may be comprised of multiple data structures instead of a single data structure. These data structures may be maintained within a storage area within the printer manager 6 or in a storage area elsewhere within the network printing system 2, such as the storage 10.

The printer manager 6 and printer controllers 8a, b, c are described as implemented in separate server machines networked together. In alternative embodiments, functions performed by the printer manager 6 may be implemented within one or more printer controllers 8a, b, c. Moreover, each printer controller 8a, b, c, may be capable of implementing more or less print daemons than the three print daemons illustrated in the preferred embodiment. In yet further embodiments, the printer manager and printer controllers 8a, b, c may be implemented as software programs within a single server, or as software within the printing unit.

Preferred embodiments concern the RIPping of print jobs and subsequent transmittal to a printer 12a, b, c, d for printing. In certain embodiments, numerous print jobs may be RIPped in advance before submitting the RIPped print jobs to the printer for printing. In this way, the RIP process is separated from the printing process and jobs are RIPped offline from actual printing operation. Because RIPping can take significantly longer than printing, in preferred embodiments, numerous print jobs may be RIPped in advance to submit to the printer. Alternatively, a RIPped print job may be immediately submitted to the printer 12a, b, c, d after RIPping.

The logic of FIG. 5 is for illustrative purposes. Additional or alternative steps may be performed in addition to those illustrated in the logic. Further, the order of the steps in the preferred logic may also vary.

In summary, preferred embodiments in accordance with the present invention provide a system for processing a print job. A processing unit receives a plurality of print job files, wherein each print job file is associated with a data file. The print job files are associated with a queue of printjob files. The processing unit selects a print job file in the queue and processes a data structure indicating a plurality of transform processes and the availability of each indicated transform process to process a data file. The processing unit selects an available transform process in response to processing the data structure and indicates in the data structure that the selected transform process is unavailable. The transform process processes the data file associated with the selected print job to generate a printer supported output data stream.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing a print job, comprising the steps of:

receiving a plurality of print job files, wherein each print job file is associated with a data file;

associating the print job files with a queue of print job files;

selecting a print job file in the queue;

processing a data structure indicating a plurality of transform processes executing in a plurality of processing units and the availability of each indicated transform process to process a data file;

selecting an available transform process in response to processing the data structure;

indicating in the data structure that the selected transform process is unavailable; and processing the data file associated with the selected print job with the selected transform process to generate a printer supported output data stream.

2. The method of claim 1, further comprising the steps of processing a plurality of data files to generate a plurality of printer supported output data streams and submitting the output data streams to the printer after the plurality of output data streams have been generated.

3. The method of claim 1, further comprising the step of indicating at least one transform process as unavailable to increase processing availability for non-transform process operations.

4. A method for processing a print job, comprising:

receiving a plurality of print job files, wherein each print job file is associated with a data file;

associating the print job files with a queue of print job files;

selecting a print job file in the queue;

processing a data structure indicating a plurality of transform processes and the availability of each indicated transform process to process a data file, wherein a plurality of transform processes are executing in a plurality of processing units, wherein the data structure indicates a processing unit address and an address of the transform process executing within the processing unit;

selecting an available transform process in response to processing the data structure by determining the address of the processing unit executing the selected transform process and the address of the selected transform process within the processing unit;

indicating in the data structure that the selected transform process is unavailable; and processing the data file associated with the selected print job with the selected transform process to generate a printer supported output data stream.

5. The method of claim 4, wherein the data structure further includes a field indicating whether the transform processes are in one of an enabled state and disabled state, further comprising the step of indicating in the data structure one of an enabled state and disabled state for the transform processes, wherein the step of selecting an available transform process further comprises selecting a transform process having an enabled state.

6. The method of claim 4, wherein a server performs the steps of receiving the print job files, associating the print job files with the queue, selecting a print job file, processing the data structure, and wherein the step of processing the data file comprises the server causing the transmittal of the data file to the transform process at the determined processing unit address and the determined transform process address.

7. A method for processing a print job, comprising:

receiving a plurality of print job files, wherein each print job file is associated with a data file, wherein the print job file indicates a storage address of the associated data file;

associating the print job files with a queue of print job files;

selecting a print job file in the queue;

processing a data structure indicating a plurality of transform processes and the availability of each indicated transform process to process a data file;

selecting an available transform process in response to processing the data structure;

indicating in the data structure that the selected transform process is unavailable; and processing the data file associated with the selected print job with the selected transform process to generate a printer supported output data stream by retrieving the data file from the storage address indicated in the selected print job file and transmitting the data file to the transform process for processing.

8. The method of claim 7, wherein the print job file further indicates a location field indicating a storage address of where to store the generated output data stream and print parameters to control the transform process, wherein the step of processing the data file further comprises processing the data file according to the print parameters indicated in the print job file and storing the output data stream at the storage address indicated in the location field.

9. A method for processing a print job, comprising the steps of:

receiving a plurality of print job files, wherein each print job file is associated with a data file;

associating the print job files with a queue of print job files;

selecting a print job file in the queue;

processing a data structure indicating a plurality of transform processes and the availability of each indicated transform process to process a data file;

selecting an available transform process in response to processing the data structure;

indicating in the data structure that the selected transform process is unavailable; and processing the data file associated with the selected print job with the selected transform process to generate a printer supported output data stream by separating the data file into component parts and processing the component parts to generate printer supported output data stream for each component part, wherein the transform process fails after determining failure of the transform process of at least one of the component parts.

10. A system for processing a print job, comprising:

means for generating print job files, wherein each print job file is associated with a data file;

a plurality of processing units, wherein each processing unit includes at least one executing transform process for processing the data file associated with one print job with to generate a printer supported output data stream;

program logic comprised of:
 (i) means for receiving a plurality of print job files, wherein each print job file is associated with a data file;
 (ii) means for associating the print job files with a queue of print job files;
 (iii) means for selecting a print job file in the queue;
 (iv) means for processing a data structure indicating the plurality of transform processes executing in the plurality of processing units and the availability of each indicated transform process to process a data file;
 (v) means for selecting an available transform process for processing the selected print job file in response to processing the data structure; and (vi) means for indicating in the data structure that the selected transform process is unavailable.

11. The system of claim 10, wherein the means for generating the print job files comprises a client computer, wherein the program logic is implemented in a server, further comprising a network providing communication among the client computer, the server, and the processing unit, wherein the server includes means for causing the transmittal of the data file to the processing unit via the network.

12. The system of claim 10 further comprising a printer, wherein the processing unit processes a plurality of data files to generate a plurality of printer supported output data streams and submits the output data streams to the printer after the plurality of output data streams have been generated.

13. A system for processing a print job, comprising:
means for generating print job files, wherein each print job file is associated with a data file;
program logic comprised of:
(i) means for receiving a plurality of print job files, wherein each print job file is associated with a data file;
(ii) means for associating the print job files with a queue of print job files;
(iii) means for selecting a print job file in the queue;
(iv) means for processing a data structure indicating a plurality of transform processes and the availability of each indicated transform process to process a data file, wherein the data structure indicates a processing unit address and an address of the transform process executing within the processing unit;
(v) means for selecting an available transform process in response to processing the data structure by determining the address of the processing unit executing the selected transform process and the address of the selected transform process within the processing unit; and
(vi) means for indicating in the data structure that the selected transform process is unavailable; and
a processing unit including means for processing the data file associated with the selected print job with the selected transform process to generate a printer supported output data stream.

14. A system for processing a print job, comprising:
a storage unit;
means for generating print job files, wherein each print job file is associated with a data file;
program logic comprised of:
(i) means for receiving a plurality of print job files, wherein each print job file is associated with a data file, and wherein the print job file indicates a storage address of the associated data file in the storage unit;
(ii) means for associating the print job files with a queue of print job files;
(iii) means for selecting a print job file in the queue;
(iv) means for processing a data structure indicating a plurality of transform processes and the availability of each indicated transform process to process a data file;
(v) means for selecting an available transform process in response to processing the data structure; and
(vi) means for indicating in the data structure that the selected transform process is unavailable; and
a processing unit including means for processing the data file associated with the selected print job with the selected transform process to generate a printer supported output data stream by retrieving the data file from the storage address indicated in the selected print job file and transmitting the data file to the transform process for processing.

15. An article of manufacture for use in processing a print job, the article of manufacture comprising computer readable storage media including at least one computer program embedded therein that causes a first processing unit to perform the steps of:
receiving a plurality of print job files, wherein each print job file is associated with a data file;
associating the print job files with a queue of print job files;
selecting a print job file in the queue;
processing a data structure indicating a plurality of transform processes executing in a plurality of processing units and the availability of each indicated transform process to process a data file;
selecting an available transform process in response to processing the data structure;
indicating in the data structure that the selected transform process is unavailable; and
transmitting the data file associated with the selected print file to a second processing unit executing the selected transform process to generate a printer supported output data stream.

16. The article of manufacture of claim 15, further comprising the steps of indicating at least one transform process as unavailable to increase processing availability for non-transform process operations.

17. The article of manufacture of claim 15, further comprising the steps of processing a plurality of data files to generate a plurality of printer supported output data streams and submitting the output data streams to the printer after the plurality of output data streams have been generated.

18. An article of manufacture for use in processing a print job, the article of manufacture comprising computer readable storage media including at least one computer program embedded therein that causes a first processing unit to perform:
receiving a plurality of print job files, wherein each print job file is associated with a data file;
associating the print job files with a queue of print job files;
selecting a print job file in the queue;
processing a data structure indicating a plurality of transform processes and the availability of each indicated transform process to process a data file, wherein a plurality of transform processes are executing in a plurality of additional processing units, and wherein the data structure indicates a processing unit address and an address of the transform process executing within the processing unit;
selecting an available transform process in response to processing the data structure by determining the address of the processing unit executing the selected transform process and the address of the selected transform process within the processing unit;
indicating in the data structure that the selected transform process is unavailable; and
transmitting the data file associated with the selected print file to the processing unit executing the selected transform process to generate a printer supported output data stream.

19. The article of manufacture of claim 18, wherein the data structure further includes a field indicating whether the transform processes are in one of an enabled state and disabled state, further causing the first processing unit to perform the step of indicating in the data structure one of an enabled state and disabled state for the transform processes, wherein the step of selecting an available transform process further comprises selecting a transform process having an enabled state.

20. An article of manufacture for use in processing a print job, the article of manufacture comprising computer readable storage media including at least one computer program embedded therein that causes a first processing unit to perform:

receiving a plurality of print job files, wherein each print job file is associated with a data file, wherein the print job file indicates a storage address of the associated data file;

associating the print job files with a queue of print job files;

selecting a print job file in the queue;

processing a data structure indicating a plurality of transform processes and the availability of each indicated transform process to process a data file;

selecting an available transform process in response to processing the data structure;

indicating in the data structure that the selected transform process is unavailable;

retrieving the data file from the storage address indicated in the selected print job file; and transmitting the data file associated with the selected print file to a second processing unit executing the selected transform process to generate a printer supported output data stream.

21. The article of manufacture of claim 20, wherein the print job file further indicates a location field indicating a storage address of where to store the generated output data stream and print parameters to control the transform process, wherein the step of processing the data file further comprises processing the data file according to the print parameters indicated in the print job file and storing the output data stream at the storage address indicated in the location field.

22. An article of manufacture for use in processing a print job, the article of manufacture comprising computer readable storage media including at least one computer program embedded therein that causes a first processing unit to perform:

receiving a plurality of print job files, wherein each print job file is associated with a data file;

associating the print job files with a queue of print job files;

selecting a print job file in the queue;

processing a data structure indicating a plurality of transform processes and the availability of each indicated transform process to process a data file;

selecting an available transform process in response to processing the data structure;

indicating in the data structure that the selected transform process is unavailable; and transmitting the data file associated with the selected print file to a second processing unit executing the selected transform process to generate a printer supported output data stream, wherein the transform process separates the data file into component parts and processing the component parts to generate printer supported output data streams for each component part, wherein the transform process fails after determining failure of the transform process of at least one of the component parts fails.

23. A memory device for access by a processing unit including data structures accessible to the processing unit when processing a print job, the memory device comprising:

a plurality of print job data structures, wherein each print job data structure indicates at least one associated data file;

a queue data structure representing a queue of a plurality of received print job data structures, wherein the processing unit selects a print job data structure in the queue; and a transform process data structure indicating a plurality of transform processes executing in a plurality of transform processing units and the availability of each indicated transform process to process a data file, wherein the processing unit processes the transform process data structure to select an available transform process and indicates in the transform process data structure that the selected transform process is unavailable, wherein the processing unit transfers the data file associated with the selected print job data structure to the selected transform process to generate a printer supported output data stream.

24. The memory device of claim 23, wherein the transform process data structure further includes a field indicating whether the transform processes are in one of an enabled state and disabled state, wherein the processing unit indicates in the transform process data structure one of an enabled state and disabled state for the transform processes, and wherein the processing unit selects an available transform process by selecting a transform process having an enabled state.

25. A memory device for access by a first processing unit including data structures accessible to the first processing unit when processing a print job, the memory device comprising:

a plurality of print job data structures, wherein each print job data structure indicates at least one associated data file;

a queue data structure representing a queue of a plurality of received print job data structures, wherein the first processing unit selects a print job data structure in the queue; and a transform process data structure indicating a plurality of transform processes and the availability of each indicated transform process to process a data file, wherein a plurality of transform processes are implemented in a plurality of additional processing units, wherein the transform process data structure further indicates a processing unit address and an address of the transform process executing within the processing unit, wherein the first processing unit processes the transform process data structure to select an available transform process and indicates in the transform process data structure that the selected transform process is unavailable, wherein the first processing unit determines the address of the processing unit executing the selected transform process and the address of the selected transform process within the transform processing unit, and wherein the first processing unit transfers the data file associated with the selected print job data structure to the selected transform process to generate a printer supported output data stream.

26. A memory device for access by a processing unit including data structures accessible to the processing unit when processing a print job, the memory device comprising:
- a plurality of print job data structures, wherein each print job data structure indicates at least one associated data file and a storage address of the data file;
- a queue data structure representing a queue of a plurality of received print job data structures, wherein the processing unit selects a print job data structure in the queue; and
- a transform process data structure indicating a plurality of transform processes and the availability of each indicated transform process to process a data file, wherein the processing unit processes the transform process data structure to select an available transform process and indicates in the transform process data structure that the selected transform process is unavailable, and wherein the processing unit retrieves the data file from the storage address indicated in the selected print job data structure and transmits the retrieved data file to the selected transform process to generate a printer supported output data stream.

27. The memory device of claim 26, wherein the print job data structure further indicates a location field indicating a storage address of where to store the generated output data stream and print parameters to control the transform process, wherein the step of processing the data file further comprises processing the data file according to the print parameters indicated in the print job file and storing the output data stream at the storage address indicated in the location field.

28. A system for processing a print job, comprising:
- means for generating print job files, wherein each print job file is associated with a data file;
- program logic comprised of:
    - (i) means for receiving a plurality of print job files, wherein each print job file is associated with a data file;
    - (ii) means for associating the print job files with a queue of print job files;
    - (iii) means for selecting a print job file in the queue;
    - (iv) means for processing a data structure indicating a plurality of transform processes and the availability of each indicated transform process to process a data file;
    - (v) means for selecting an available transform process in response to processing the data structure; and
    - (vi) means for indicating in the data structure that the selected transform process is unavailable; and
- a processing unit including means for processing the data file associated with the selected print job with the selected transform process to generate a printer supported output data stream by separating the data file into component parts and processing the component parts to generate printer supported output data streams for each component part, wherein the transform process fails after determining failure of the transform process of at least one of the component parts fails.

* * * * *

UNITED STATES PATENT AND TRADEMARK OFFICE
CERTIFICATE OF CORRECTION

PATENT NO. : 6,373,585 B1
DATED : April 16, 2002
INVENTOR(S) : Christopher B. Hirsch et al.

It is certified that error appears in the above-identified patent and that said Letters Patent is hereby corrected as shown below:

<u>Column 12,</u>
Line 52, delete "with".

Signed and Sealed this

Twenty-fourth Day of January, 2006

JON W. DUDAS
*Director of the United States Patent and Trademark Office*